Patented July 18, 1944

2,353,675

UNITED STATES PATENT OFFICE 2,353,675

MONOAZO DYESTUFFS AND THEIR MANUFACTURE

Oscar Knecht and Otto Senn, Basel, Switzerland, assignors to the firm Sandoz Ltd., Fribourg, Switzerland No Drawing. Application February 6, 1941, Serial No. 377,748. In Switzerland February 22, 1940

8 Claims. (Cl. 260—197)

The present invention relates to new monoazo dyestuffs and to a process for their manufacture.

It has been found that very valuable 1:1'-dihydroxyazo dyestuffs can be prepared if diazotized 1-hydroxy-2-aminobenzene sulphonic acids of the general formula

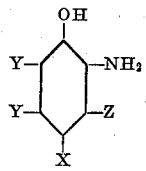

wherein one of the Y's represents a sulphonic acid group, the other one standing for hydrogen, halogen and nitro, X represents a halogen, nitro, alkyl, alkoxy, acylamino, alkylsulphone, arylsulphone and a sulphamide group, and Z represents hydrogen and halogen, are coupled in a concentrated caustic alkaline medium with 1-hydroxy-naphthalene. The dyestuffs thus obtained may further be transformed into their metal complex compounds by treating them in substance by the usual processes employed in the dyestuff industry for this purpose.

By working under the conditions said above, the ortho-hydroxydiazo compound couples with 1-hydroxynaphthalene in ortho-position to the hydroxy group, whereas by working in the usual manner the diazo compound couples in para-position. Therefore the dyestuffs obtained according to the present process dye wool by the one-bath chrome- or the after-chrome process violet, blue to black shades, whereas the corresponding para-isomers dye wool useless brown shades.

It could not be foreseen that it would be possible to conduct the coupling in such a manner and this on a technical scale, that the specific diazo compounds mentioned above couple in ortho-position to the hydroxy group.

According to the actual state of knowledge and technical publications all diazo compounds with the exception of 1:2- and 2:1-diazohydroxy-naphthalene sulphonic acids and their nitrated, halogenated and sulphonated derivatives couple utmost in para-position to the hydroxy group of 1-hydroxynaphthalene and only a very small percentage of the ortho-coupling isomer is obtained (see: Fierz—David, "Künstliche organische Farbstoffe," 1926, page 101; further Helv. Chim. Acta 1921, page 380).

The new deystuffs differ from the respective known dyestuffs prepared from 2-hydroxynaphthalene by their greener and more brilliant shade, by their better solubility and their smaller sensitiveness to hard water.

As compared to the known dyestuffs prepared from o-hydroxydiazonaphthalene sulphonic acids and their derivatives and 1-hydroxynaphthalene, the new products possess a better fastness to light and especially they possess the property of being dyed by the so-called one-bath chrome method.

The present invention comprises therefore the dyestuffs of the general formula

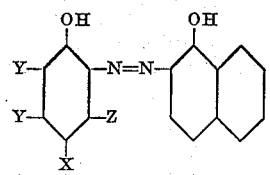

Wherein one of the Y's represents a sulphonic acid group, the other one standing for hydrogen, halogen and nitro, X represents a halogen, nitro, alkyl, alkoxy, acylamino, alkylsulphone, arylsulphone and a sulphamide group, and Z represents hydrogen and halogen, which dye wool by the one-bath chrome- and after-chrome process violet, blue and black shades, possessing excellent properties of fastness.

Another object of the present invention is the transformation of the dyestuffs of the above formula into their heavy metal complex compounds by treating them with heavy metal salts in substance or on the fibre.

Still another object of the present invention is the process of producing the monoazo dyestuffs of the above formula, wherein the coupling of the components takes place in a concentrated caustic alkaline bath.

The following examples, without being limitative, show how the present invention can be carried out, the parts being by weight, where nothing other is stated:

Example 1

40.6 parts of 4-methyl-2-amino-1-hydroxybenzene-5-sulphonic acid are diazotized in the usual manner and in such a way, that the final volume of the diazo solution is not more than 150 parts. The diazo compound is then introduced at 0° C. into a suspension of the sodium salt of 1-hydroxy-naphthalene in concentrated caustic soda, which suspension has been prepared by introducing a solution of 29 parts of 1-hydroxynaphthalene in 20 parts of water and 30 parts of a 30% caustic soda solution into a solution of 170 parts of caustic soda in 280 parts of water at 0° C. The reaction solution becomes immediately dark. After the coupling is finished, the mixture is diluted with 500 parts of water and the alkali neutralized with hydrochloric acid until the dyestuff becomes precipitated. The same is then filtered, if desired redissolved and reprecipitated, in order to purify it, and dried. The dry and powdered dyestuff is soluble in water with a violet and in concentrated sulphuric acid with a wine-red coloration. The dyestuff possesses the formula

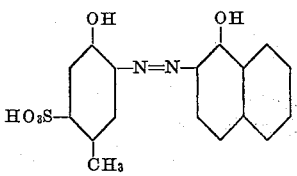

and dyes wool from an acid bath a bluish-red shade and gives after chroming a reddish navy-blue, possessing good fastness properties.

*Example 2*

The diazo compound prepared from 44.7 parts of 4-chloro-2-amino-1-hydroxybenzene-6-sulphonic acid is introduced into an emulsion of 29 parts of finely powdered 1-hydroxynaphthalene in 500 parts of a 30% caustic soda lye. The reaction mass becomes slowly dark-red and, according to the formation of the dyestuff, thicker and thicker. It is then stirred during 12 hours and worked up in the manner described in Example 1. After drying a bronzing powder soluble in water with a blue-violet and in concentrated sulphuric acid with a wine-red shade is obtained.

The dyestuff thus obtained possesses the formula

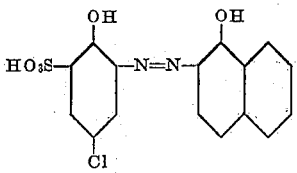

and dyes wool by the after-chrome or one-bath chrome process a full navy-blue shade of excellent fastness properties.

In a similar manner dyestuffs may be prepared from the following 2-amino-1-hydroxybenzene sulphonic acids and 1-hydroxynaphthalene:

|  | After-chromed, dyeing on wool |
|---|---|
| 4-chloro-2-amino-1-hydroxybenzene-5-sulphonic acid | Navy-blue |
| 4-methyl-2-amino-1-hydroxybenzene-6-sulphonic acid | Reddish navy-blue |
| 3:4-dichloro-2-amino-1-hydroxybenzene-6-sulphonic acid | Violet |
| 4-nitro-2-amino-1-hydroxybenzene-6-sulphonic acid | Black-olive |
| 4-chloro-5-nitro-2-amino-1-hydroxybenzene-6-sulphonic acid | Greenish blue |
| 4-acetylamino-2-amino-1-hydroxybenzene-6-sulphonic acid | Navy-blue |
| 4-benzoylamino-2-amino-1-hydroxybenzene-6-sulphonic acid | Greenish navy-blue |
| 4-bromo-2-amino-1-hydroxybenzene-6-sulphonic acid | Navy-blue |

*Example 3*

58.5 parts of 3:4:6-trichloro-2-amino-1-hydroxybenzene-5-sulphonic acid are diazotized in the smallest volume possible. The diazo compound which to the greatest part precipitates in form of yellow needles is introduced at 0° C. into a suspension of 1-hydroxynaphthalene in concentrated caustic soda lye prepared in the manner described in Example 1. Very rapidly a red solution is obtained. After the coupling is finished, the dyestuff is precipitated by neutralizing the caustic alkali with concentrated hydrochloric acid and if desired purified by reprecipitating it again. The dry and powdered dyestuff is a dark powder, soluble in water with a blue and in concentrated sulphuric acid with a brown coloration.

The new dyestuff possesses the formula

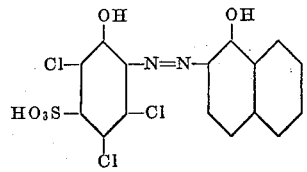

and dyes wool by the after-chroming or one-bath chrome process a beautiful navy-blue shade with excellent fastness properties.

*Example 4*

40 parts of the dyestuff prepared according to Example 2 are dissolved in 50 parts of water, to which chromium formate has been added in such an amount that it corresponds to 12 parts of chromium oxide. The reaction mixture is then boiled at the reflux condenser for 12 hours. From the blue solution thus obtained the complex chromium compound is salted out by means of an addition of sodium chloride and worked up in the usual manner. The dry dyestuff is a dark powder, which is soluble in water with a blue and in concentrated sulphuric acid with a violet-brown coloration. It dyes wool from an acid bath reddish-blue shades.

What we claim is:—

1. New monoazo dyestuffs of the general formula

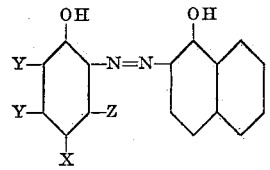

wherein one of the Y's represents a sulphonic acid group, the other one standing for a member of the group consisting of hydrogen, halogen and nitro, X represents a member of the class consisting of halogen, nitro, alkyl, alkoxy, acylamino, alkylsulphone, arylsulphone and sulphamide group, and Z represents a member of the group consisting of hydrogen and halogen, which on treatment with chromium salts give chrome-complex compounds and which dye animal fibres by the one-bath chrome and the after-chrome process violet, blue and black shades.

2. The monoazo dyestuff of the formula

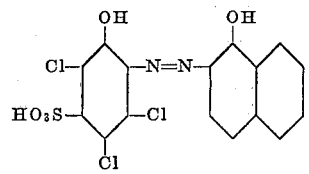

which dyes wool by the one-bath chrome- and afterchroming method navy-blue shades of excellent fastness properties.

3. The monoazo dyestuff of the formula

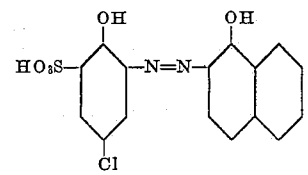

which dyes wool by the one-bath chrome- and afterchroming method reddish navy-blue shades of excellent fastness properties.

4. The monoazo dyestuff of the formula

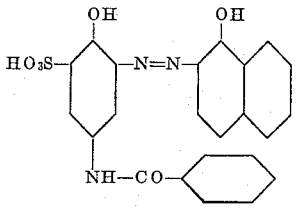

which dyes wool by the one-bath chrome- and afterchroming method greenish navy-blue shades of excellent fastness properties.

5. A process for the manufacture of new monoazo dyestuffs, comprising coupling a diazo compound prepared from an o-aminophenol sulphonic acid of the general formula

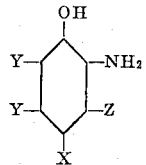

wherein one of the Y's represents a sulphonic acid group, the other one standing for a member of the group consisting of hydrogen, halogen and nitro, X represents a member of the class consisting of halogen, nitro, alkyl, alkoxy, acylamino, alkylsulphone, arylsulphone and sulphamide group, and Z represents a member of the group consisting of hydrogen and halogen, in a concentrated caustic alkaline medium with 1-hydroxynaphthalene.

6. A process for the manufacture of a new monoazo dyestuff, comprising coupling diazotized 3:4:6-trichloro - 2 - amino-1-hydroxybenzene-5-sulphonic acid with 1-hydroxynaphthalene in a concentrated caustic alkali medium.

7. A process for the manufacture of a new monoazo dyestuff, comprising coupling diazotized 4 - chloro-2-amino-1-hydroxybenzene-6-sulphonic acid with 1-hydroxynaphthalene in a concentrated caustic alkali medium.

8. A process for the manufacture of a new monoazo dyestuff, comprising coupling diazotized 4-benzoylamino - 2 - amino-1-hydroxybenzene-6-sulphonic acid with 1-hydroxynaphthalene in a concentrated caustic alkali medium.

OSCAR KNECHT.
OTTO SENN.